US011012630B1

(12) United States Patent
Noguchi et al.

(10) Patent No.: US 11,012,630 B1
(45) Date of Patent: May 18, 2021

(54) IMAGE PROCESSOR AND IMAGE PROCESSING METHOD

(71) Applicant: Panasonic Intellectual Property Management Co., Ltd., Osaka (JP)

(72) Inventors: Yoshimitsu Noguchi, Osaka (JP); Tomokuni Iijima, Osaka (JP); Katsuyuki Morita, Osaka (JP); Shigeru Furumiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/031,126

(22) Filed: Sep. 24, 2020

(51) Int. Cl.
*H04N 5/235* (2006.01)

(52) U.S. Cl.
CPC ......... *H04N 5/2352* (2013.01); *H04N 5/2355* (2013.01)

(58) Field of Classification Search
CPC ............. H04N 5/2355; H04N 5/35581; H04N 5/35554; H04N 5/144; H04N 7/18; H04N 5/235; H04N 5/232; H04N 5/243; H04N 5/2352; H04N 5/23216; H04N 5/23203; H04N 5/2351; H04N 5/2353; H04N 5/23264; H04N 5/23238; H04N 5/232411; H04N 5/23232; H04N 5/2258; G06T 5/007; G06T 5/50; G06T 2207/10004; G06T 2207/10144; G06T 2207/20208; G06T 7/62; G06T 2207/30232; G06T 2207/20212; G06K 9/3233; G06K 9/00771
See application file for complete search history.

(56) References Cited

U.S. PATENT DOCUMENTS

| | | | | |
|---|---|---|---|---|
| 6,720,993 | B1 * | 4/2004 | Hwang | .................. H04N 5/235 348/208.13 |
| 2005/0264682 | A1 * | 12/2005 | Kurane | ................ H04N 5/2352 348/362 |
| 2011/0222793 | A1 | 9/2011 | Ueda et al. | |

(Continued)

FOREIGN PATENT DOCUMENTS

| | | |
|---|---|---|
| JP | 2011-188277 | 9/2011 |
| JP | 2016-139876 | 8/2016 |

*Primary Examiner* — Mekonnen D Dagnew
(74) *Attorney, Agent, or Firm* — Greenblum & Bernstein, P.L.C.

(57) ABSTRACT

An image processor includes: an image sensor which outputs a short exposure image and a long exposure image; a sensor controller which controls first and second exposure sensitivities; a motion blending ratio calculator which calculates a motion blending ratio based on a motion amount of a subject; a motion-adapted image synthesizer which generates a motion-adapted image based on the motion blending ratio; and an HDR image synthesizer which synthesizes the motion-adapted image and the short exposure image, to generate an HDR image. The sensor controller controls the first exposure sensitivity: so that the first exposure time changes from increasing to constant and the first sensor gain changes from constant to increasing, when the brightness of the subject decreases from a first subject brightness; and so that the first exposure time changes to increasing and the first sensor gain changes to constant, when the brightness decreases from a second subject brightness.

4 Claims, 14 Drawing Sheets

(56) References Cited

U.S. PATENT DOCUMENTS

| | | | | |
|---|---|---|---|---|
| 2011/0254976 | A1* | 10/2011 | Garten | G06F 3/1454 |
| | | | | 348/229.1 |
| 2012/0218442 | A1* | 8/2012 | Jandhyala | G06T 5/50 |
| | | | | 348/239 |
| 2015/0296116 | A1* | 10/2015 | Tsuzuki | H04N 5/23254 |
| | | | | 348/208.1 |
| 2016/0352995 | A1* | 12/2016 | Min | G06T 5/50 |

* cited by examiner

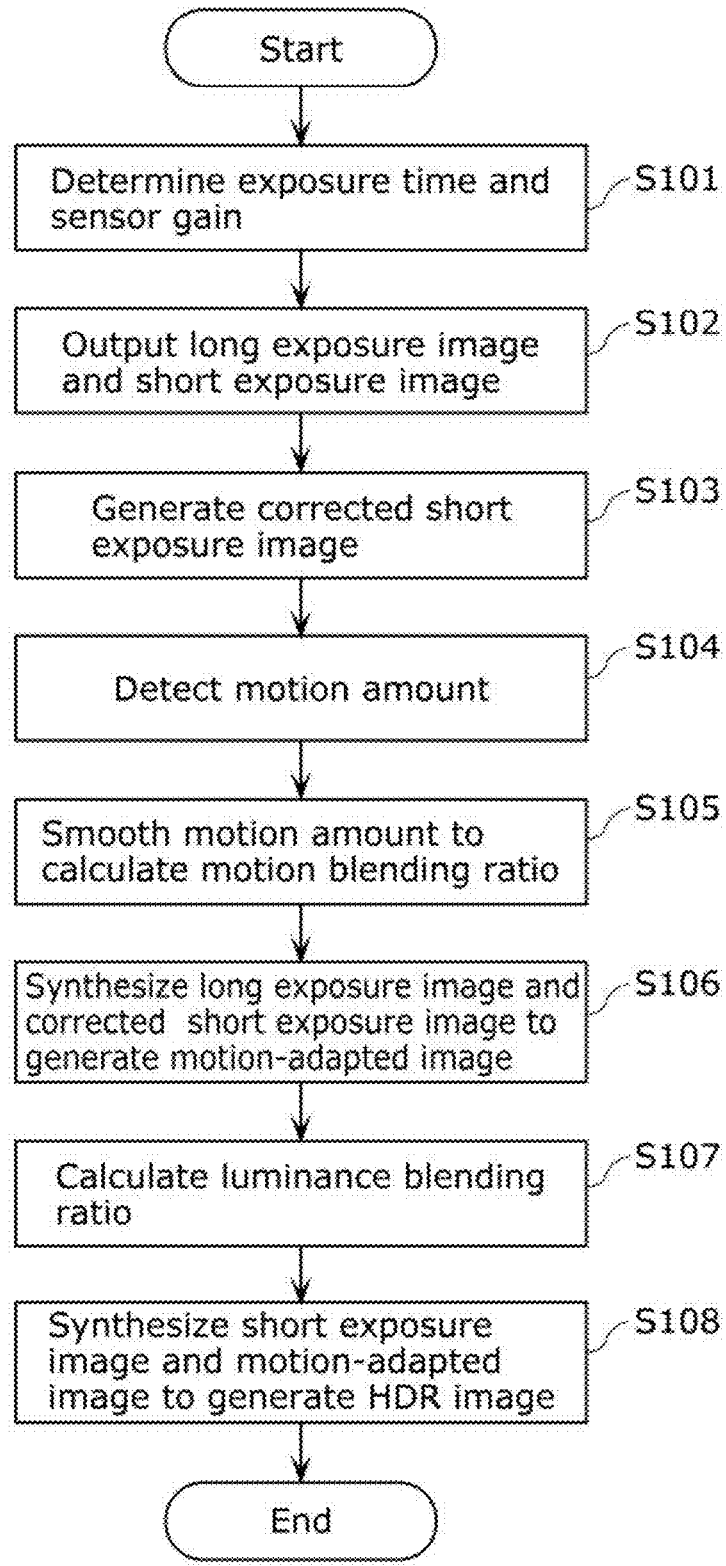

FIG. 6
Comparative example
(a) Long exposure image (illuminance L4)
Second exposure time: T3
Second sensor gain: G4
(b) Corrected short exposure image (illuminance L4)
First exposure time: T4
First sensor gain: G4
(c) HDR image (illuminance L4)

FIG. 7
Comparative example
(a) Long exposure image (illuminance L5)
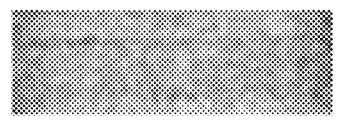
Second exposure time: T3
Second sensor gain: G5
(b) Corrected short exposure image (illuminance L5)
First exposure time: T4
First sensor gain: G5
(c) HDR image (illuminance L5)

FIG. 8
Example
(a) Long exposure image (illuminance L4)
Second exposure time: T3
Second sensor gain: G4
(b) Corrected short exposure image (illuminance L4)
First exposure time: T1
First sensor gain: G6
(c) HDR image (illuminance L4)

FIG. 9
Example
(a) Long exposure image (illuminance L5)
Second exposure time: T3
Second sensor gain: G5
(b) Corrected short exposure image (illuminance L5)
First exposure time: T5
First sensor gain: G2
(c) HDR image (illuminance L5)

IMAGE PROCESSOR AND IMAGE PROCESSING METHOD

FIELD

The present disclosure relates to an image processor and an image processing method.

BACKGROUND

Image processors disclosed in Patent Literatures 1 and 2 have been known as techniques of generating a high dynamic range (HDR) image having a wide dynamic range by synthesizing a plurality of images of subjects captured in different exposure times.

In the image processor of Patent Literature 1, a reference image and other images are compared with each other so as to detect dynamic areas included in the images. Furthermore, in the image processor, a dynamic area included in the reference image is replaced with a corresponding area of another image so as to generate a replacement image. An HDR image is generated by synthesizing the replacement image and the reference image. In this way, the HDR image is generated in consideration of a moving object.

In the image processor in Patent Literature 2, a synthesis ratio of a plurality of images captured with different exposure times and to be synthesized is determined based on saturation degrees of areas in which motions of a subject have been detected, when the plurality of images of the subject are synthesized. In this way, an HDR image with a reduced noise influence, etc. is generated.

CITATION LIST

Patent Literature

Patent Literature 1: Japanese Unexamined Patent Application Publication No. 2011-188277
Patent Literature 2: Japanese Unexamined Patent Application Publication No. 2016-139876

SUMMARY

However, the image processors according to the related art can be improved.

In view of this, the present disclosure provides an image processor and an image processing method which enable further improvement.

An image processor according to an aspect of the present disclosure is an image processor which generates a high dynamic range (HDR) image of a subject. The image processor includes: an image sensor which outputs, in one-frame time, (i) a first image of the subject captured with a first exposure time and a first sensor gain and (ii) a second image of the subject captured with a second exposure time and a second sensor gain, the second exposure time being longer than the first exposure time; a sensor controller which, when a brightness of the subject changes, (i) controls a first exposure sensitivity so that the first image has a first image brightness and (ii) controls a second exposure sensitivity so that the second image has a second image brightness, the first exposure sensitivity being a product of the first exposure time and the first sensor gain, the second exposure sensitivity being a product of the second exposure time and the second sensor gain; a level adjuster which adjusts a luminance level of the first image to substantially match a luminance level of the second image, to generate a corrected image from the first image; a motion amount detector which detects a motion amount of the subject based on a difference in pixel value between pixels co-located in the corrected image and the second image; a motion blending ratio calculator which calculates a motion blending ratio based on the motion amount, the motion blending ratio being a ratio between the corrected image and the second image when the corrected image and the second image are blended; a motion-adapted image synthesizer which synthesizes the corrected image and the second image based on the motion blending ratio, to generate a motion-adapted image; and an HDR image synthesizer which synthesizes the motion-adapted image and the first image, to generate the HDR image. The sensor controller: controls the first exposure sensitivity so that the first exposure time changes from increasing to constant and the first sensor gain changes from constant to increasing, when the brightness of the subject decreases from a first subject brightness; and controls the first exposure sensitivity so that the first exposure time changes from constant to increasing and the first sensor gain changes from increasing to constant, when the brightness of the subject decreases from a second subject brightness lower than the first subject brightness.

It is to be noted that these general and specific aspects may be implemented using a system, a method, an integrated circuit, a computer program, or a recording medium such as computer-readable compact disc-read only memory (CD-ROM), or any combination of systems, methods, integrated circuits, computer programs, or recording media.

The image processor, etc. according to the aspect of the present disclosure enables further improvement.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a flow chart indicating a flow of an operation performed by the image processor according to Embodiment 1.

FIG. 6 is a diagram showing a long exposure image, a corrected short exposure image, and an HDR image which are generated by the image processor according to the comparative example when the brightness of a subject is illuminance L4.

FIG. 7 is a diagram showing a long exposure image, a corrected short exposure image, and an HDR image which are generated by the image processor according to the comparative example when the brightness of the subject is illuminance L5.

FIG. 8 is a diagram showing a long exposure image, a corrected short exposure image, and an HDR image which are generated by an image processor according to an example when the brightness of a subject is illuminance L4.

FIG. 9 is a diagram showing a long exposure image, a corrected short exposure image, and an HDR image which are generated by the image processor according to the example when the brightness of the subject is illuminance L5.

DESCRIPTION OF EMBODIMENTS

Figure 1:
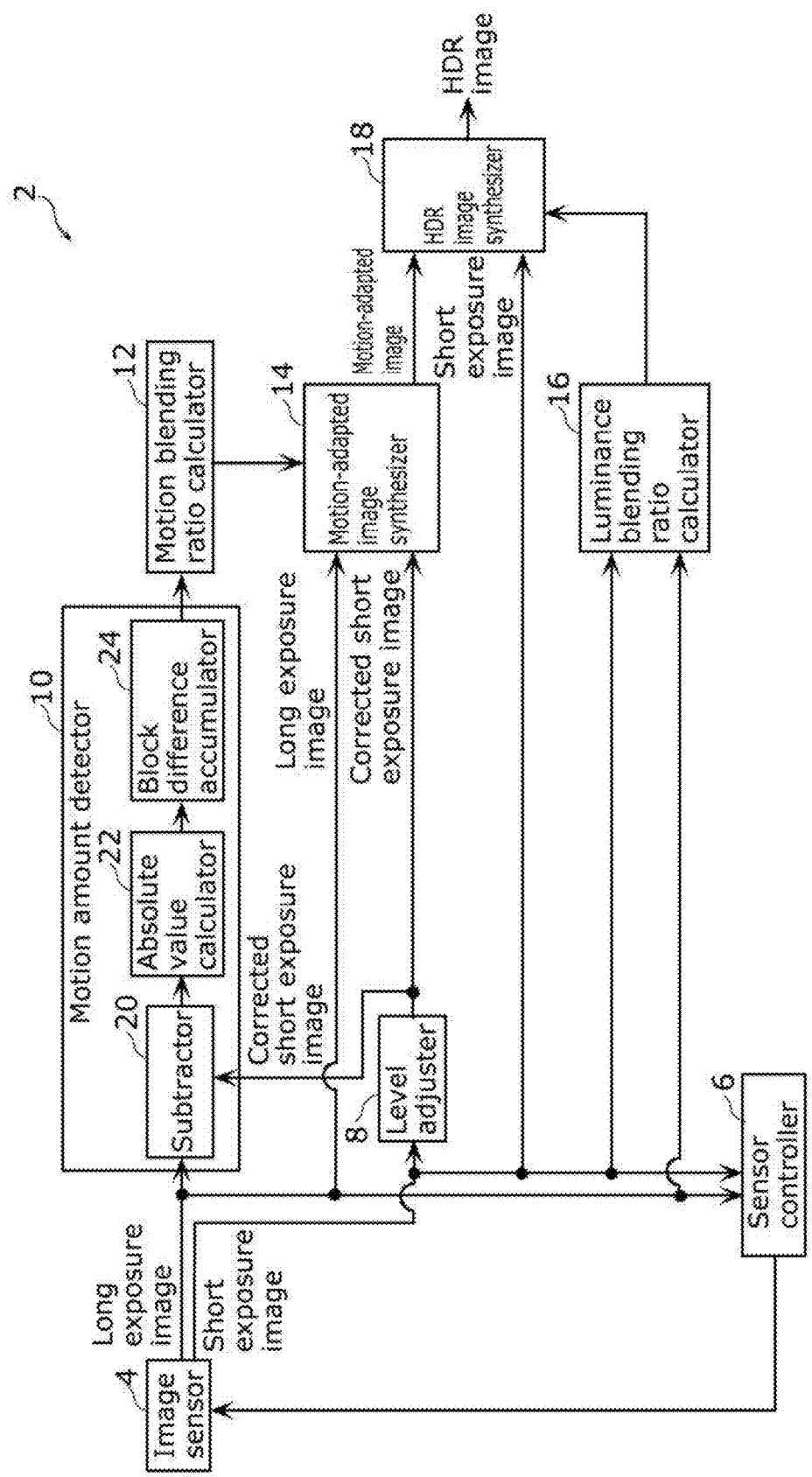
FIG. 1 is a block diagram illustrating a configuration of an image processor according to Embodiment 1.

Underlying Knowledge Forming Basis of the Present Disclosure

The Inventors have found that the image processors described in the BACKGROUND section entail problems indicated below.

The image processors described above entail a problem that motion blur may occur in an HDR image when a moving object is imaged under low illuminance, for example, at evening or night.

An image processor according to an aspect of the present disclosure is an image processor which generates a high dynamic range (HDR) image of a subject. The image processor includes: an image sensor which outputs, in one-frame time, (i) a first image of the subject captured with a first exposure time and a first sensor gain and (ii) a second image of the subject captured with a second exposure time and a second sensor gain, the second exposure time being longer than the first exposure time; a sensor controller which, when a brightness of the subject changes, (i) controls a first exposure sensitivity so that the first image has a first image brightness and (ii) controls a second exposure sensitivity so that the second image has a second image brightness, the first exposure sensitivity being a product of the first exposure time and the first sensor gain, the second exposure sensitivity being a product of the second exposure time and the second sensor gain; a level adjuster which adjusts a luminance level of the first image to substantially match a luminance level of the second image, to generate a corrected image from the first image; a motion amount detector which detects a motion amount of the subject based on a difference in pixel value between pixels co-located in the corrected image and the second image; a motion blending ratio calculator which calculates a motion blending ratio based on the motion amount, the motion blending ratio being a ratio between the corrected image and the second image when the corrected image and the second image are blended; a motion-adapted image synthesizer which synthesizes the corrected image and the second image based on the motion blending ratio, to generate a motion-adapted image; and an HDR image synthesizer which synthesizes the motion-adapted image and the first image, to generate the HDR image. The sensor controller: controls the first exposure sensitivity so that the first exposure time changes from increasing to constant and the first sensor gain changes from constant to increasing, when the brightness of the subject decreases from a first subject brightness; and controls the first exposure sensitivity so that the first exposure time changes from constant to increasing and the first sensor gain changes from increasing to constant, when the brightness of the subject decreases from a second subject brightness lower than the first subject brightness.

According to this aspect, the sensor controller controls the first exposure sensitivity so that the first exposure time changes from increasing to constant and the first sensor gain changes from constant to increasing when the brightness of the subject decreases from the first subject brightness. In this way, the first exposure time is kept to be short, for example, even when the moving subject is imaged under low illumination. Thus, it is possible to reduce motion blur in the first image. As a result, the motion blur in the motion-adapted image obtained by synthesizing the corrected image and the second image is also reduced. Thus, it is possible to reduce motion blur in the HDR image. In addition, when the brightness of the subject decreases from the second subject brightness, sensor controller controls the first exposure sensitivity so that the first exposure time changes from constant to increasing and the first sensor gain changes from increasing to constant. In this way, the first sensor gain is kept to be small, for example, even when the moving subject is imaged under extremely low illuminance. Thus, it is possible to reduce noise in the first image. As a result, the noise in the motion-adapted image obtained by synthesizing the corrected image and the second image is also reduced. Thus, it is possible to reduce noise in the HDR image.

For example, the sensor controller may be configured to control the second exposure sensitivity so that the second exposure time changes from increasing to constant and the second sensor gain changes from constant to increasing, when the brightness of the subject decreases from a third subject brightness lower than the first subject brightness According to this aspect, the sensor controller performs control so that the first exposure time changes from increasing to constant at a timing earlier than the timing at which the second exposure time changes from increasing to constant when the brightness of the subject becomes decreases. In this way, the first exposure time is kept to be short at a comparatively early timing. Thus, it is possible to effectively reduce motion blur in the first image.

For example, the sensor controller may be configured to control the first exposure sensitivity so that the first exposure time changes from increasing to constant and the first sensor gain changes from constant to increasing, when the brightness of the subject decreases from a fourth subject brightness lower than the second subject brightness.

As described above, the first exposure time changes from constant to increasing and the first sensor gain changes from increasing to constant when the brightness of the subject decreases from the second subject brightness. For this reason, for example, when the moving subject is imaged under extremely low illuminance, noise in the HDR image is reduced, but motion blur may occur in the HDR image. According to this aspect, the sensor controller performs control so that the first exposure time changes from increasing to constant when the brightness of the subject decreases from the fourth subject brightness. In this way, increase in the first exposure time is reduced. Thus, it is possible to reduce motion blur in the HDR image.

An image processing method according to an aspect of the present disclosure is an image processing method for generating a high dynamic range (HDR) image of a subject. The image processing method includes: (a) outputting, in one-frame time, (i) a first image of the subject captured with a first exposure time and a first sensor gain and (ii) a second image of the subject captured with a second exposure time and a second sensor gain, the second exposure time being longer than the first exposure time; (b) when a brightness of the subject changes, (i) controlling a first exposure sensitivity so that the first image has a first image brightness and (ii) controlling a second exposure sensitivity so that the second image has a second image brightness, the first exposure sensitivity being a product of the first exposure time and the first sensor gain, the second exposure sensitivity being a product of the second exposure time and the second sensor gain; (c) adjusting a luminance level of the first image to substantially match a luminance level of the second image, to generate a corrected image from the first image; (d) detecting a motion amount of the subject based on a difference in pixel value between pixels co-located in the corrected image and the second image; (e) calculating a motion blending ratio based on the motion amount, the motion blending ratio being a ratio between the corrected image and the second image when the corrected image and the second image are blended; (f) synthesizing the corrected image and the second image based on the motion blending ratio, to generate a motion-adapted image; and (g) synthesizing the motion-adapted image and the first image, to generate the HDR image. In (b): the first exposure sensitivity is controlled so that the first exposure time changes from increasing to constant and the first sensor gain changes from constant to increasing, when the brightness of the subject decreases from a first subject brightness; and the first exposure sensitivity is controlled so that the first exposure time changes from constant to increasing and the first sensor gain changes from increasing to constant, when the brightness of the subject decreases from a second subject brightness lower than the first subject brightness.

According to this aspect, the first exposure sensitivity is controlled so that the first exposure time changes from increasing to constant and the first sensor gain changes from constant to increasing when the brightness of the subject decreases from the first subject brightness. In this way, the first exposure time is kept to be short, for example, even when the moving subject is imaged under low illumination. Thus, it is possible to reduce motion blur in the first image. As a result, the motion blur in the motion-adapted image obtained by synthesizing the corrected image and the second image is also reduced. Thus, it is possible to reduce motion blur in the HDR image. In addition, the first exposure sensitivity is controlled so that the first exposure time changes from constant to increasing and the first sensor gain changes from increasing to constant when the brightness of the subject decreases from the second subject brightness. In this way, the first sensor gain is kept to be small, for example, even when the moving subject is imaged under extremely low illuminance. Thus, it is possible to reduce noise in the first image. As a result, the noise in the motion-adapted image obtained by synthesizing the corrected image and the second image is also reduced. Thus, it is possible to reduce noise in the HDR image.

It is to be noted that these general and specific aspects may be implemented using a system, a method, an integrated circuit, a computer program, or a recording medium such as computer-readable CD-ROM, or any combination of systems, methods, integrated circuits, computer programs, or recording media.

Hereinafter, embodiments are described in detail with reference to the drawings.

It is to be noted that each of the embodiments described below describes a general or specific example. The numerical values, shapes, materials, constituent elements, the arrangement and connection of the constituent elements, steps, the order of the steps, etc. indicated in the following embodiments are mere examples, and do not limit the present disclosure. In addition, among the constituent elements in the following exemplary embodiments, constituent elements not recited in any one of the independent claims that define the most generic concept are described as optional constituent elements.

Embodiment 1

1-1. Configuration of Image Processor

Figure 2:
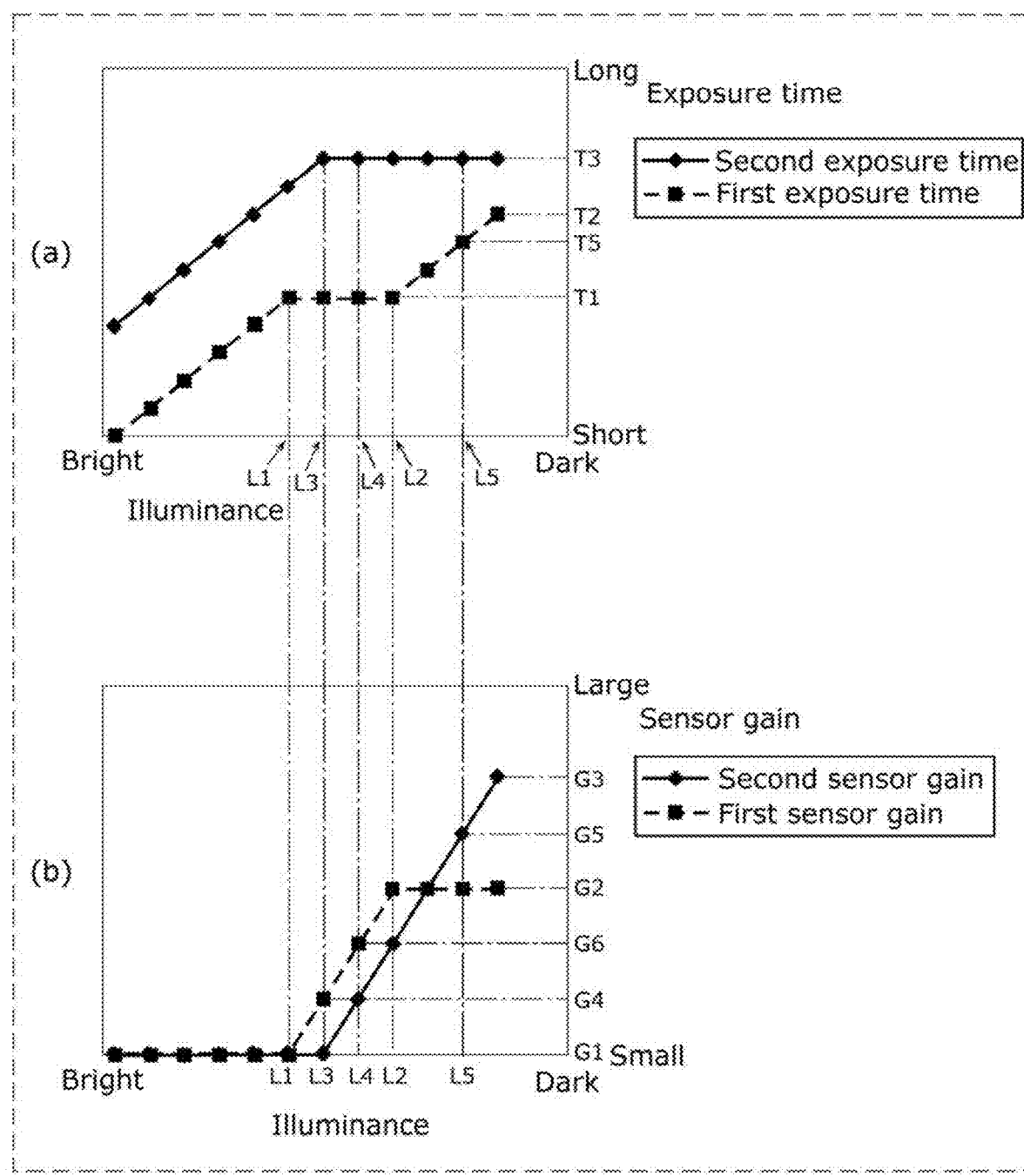
FIG. 2 is a diagram for illustrating processing performed by a sensor controller of the image processor according to Embodiment 1.

First, a configuration of image processor 2 according to Embodiment 1 is described with reference to FIGS. 1 and 2. FIG. 1 is a block diagram illustrating the configuration of image processor 2 according to Embodiment 1. FIG. 2 is a diagram for illustrating processing of sensor controller 6 of image processor 2 according to Embodiment 1.

As illustrated in FIG. 1, image processor 2 includes image sensor 4, sensor controller 6, level adjuster 8, motion amount detector 10, motion blending ratio calculator 12, motion-adapted image synthesizer 14, luminance blending ratio calculator 16, and HDR image synthesizer 18.

It is to be noted that image processor 2 is applied, for example, as a monitoring camera for imaging number plates of vehicles. Alternatively, image processor 2 may be applied to, for example, digital still cameras, digital video cameras, on-board object detection systems, on-board electronic mirrors, and on-board driving recorders.

Image sensor 4 is a so-called line-by-line image sensor which outputs, in one frame time, a short exposure image (an example of a first image) and a long exposure image (an example of a second image) of a subject captured with varying exposure times and sensor gains. Specifically, image sensor 4 outputs the short exposure image of the subject captured with a first exposure time and a first sensor gain and the long exposure image of the subject captured with a second exposure time and a second sensor gain. Here, the second exposure time is longer than the first exposure time.

Each exposure time means a time from start to end of charge accumulation performed by a photoelectric conversion element of image sensor 4 according to incident light. The sensor gain means the gain factor (amplification factor) of an amplifier for amplifying an image signal in image sensor 4. The exposure times or sensor gains are changed so as to change an exposure sensitivity which is the product of the exposure time and the sensor gain.

Line-by-line image sensor 4 starts output of a short exposure image immediately after completion of output of a long exposure image in each of first to last lines of a frame. In short, long exposure images and short exposure images are alternately output in one frame time.

As illustrated in FIG. 1, a long exposure image output from image sensor 4 is input to sensor controller 6, motion amount detector 10, motion-adapted image synthesizer 14, and luminance blending ratio calculator 16. Moreover, a short exposure image output from image sensor 4 is input to sensor controller 6, level adjuster 8, luminance blending ratio calculator 16, and HDR image synthesizer 18.

Sensor controller 6 controls the first exposure time, the first sensor gain, the second exposure time, and the second sensor gain of image sensor 4. Specifically, as illustrated in (a) and (b) in FIG. 2, sensor controller 6 performs control so that the first exposure sensitivity and the second exposure sensitivity increase as the brightness of the subjects decreases. The first exposure time is the product of the first exposure time and the first sensor gain, and the second exposure sensitivity is the product of the second exposure time and the second sensor gain. In other words, when the brightness of the subject changes, sensor 6 controls the first exposure sensitivity so that the short exposure image has a first image brightness and controls the second exposure sensitivity so that the long exposure image has a second image brightness.

As illustrated in (a) and (b) in FIG. 2, when the brightness of the subject decreases from illuminance L1 (one example of a first subject brightness), sensor controller 6 controls the first exposure sensitivity so that the first exposure time changes from increasing to constant (T1) and the first sensor gain changes from constant (G1) to increasing. Furthermore, when the brightness of the subject decreases from illuminance L2 (one example of a second subject brightness) lower than illuminance L1, sensor controller 6 controls the first exposure sensitivity so that the first exposure time changes from constant (T1) to increasing and the first sensor gain changes from increasing to constant (G2 (>G1)). In this case, a preset limit value for the first exposure time is T2 (>T1).

In addition, as illustrated in (a) and (b) in FIG. 2, when the brightness of the subject decreases from illuminance L3 (one example of a third subject brightness) lower than illuminance L1 and higher than illuminance L2, sensor controller 6 controls the second exposure sensitivity so that the second exposure time changes from increasing to constant (T3 (>T1)) and the second sensor gain changes from constant (G1) to increasing. In this case, a preset limit value for the second exposure time is G3 (>G1).

It is to be noted that, in the examples illustrated in (a) and (b) in FIG. 2, illuminance L1 is approximately 200 Lux, illuminance L2 is approximately 25 Lux, and illuminance L3 is approximately 100 Lux.

Level adjuster 8 adjusts the luminance level of the short exposure image output from image sensor 4 to substantially match the luminance level of the long exposure image, to generate a corrected short exposure image (an example of a corrected image) from the short exposure image. Specifically, level adjuster 8 raises the gain of a signal indicating the short exposure image according to the ratio of the second exposure sensitivity and the first exposure sensitivity, so that the luminance level of the short exposure image rises to or close to that of the long exposure image. Level adjuster 8 outputs the generated corrected short exposure image to motion amount detector 10 and motion-adapted image synthesizer 14.

Motion amount detector 10 detects a motion amount, which indicates the amount of a motion of a subject, based on the corrected short exposure image and the long exposure image. Motion amount detector 10 includes subtractor 20, absolute value calculator 22, and block difference accumulator 24.

Subtractor 20 calculates a difference between the long exposure image output from image sensor 4 and the corrected short exposure image output from level adjuster 8. Specifically, subtractor 20 outputs a difference that is a result of subtracting the pixel value of a pixel in the corrected short exposure image from the pixel value of a pixel in the long exposure image. The pixels are located at mutually corresponding positions. Subtractor 20 performs such subtraction on each of all the corresponding pixels of the long exposure image and the corrected short exposure image. Subtractor 20 outputs the calculated difference to absolute value calculator 22.

Absolute value calculator 22 calculates the absolute value of the difference from subtractor 20. The absolute value of the difference indicates an amount of a pixel value difference between the pixels co-located in the long exposure image and the corrected short exposure image. Absolute value calculator 22 outputs the calculated absolute value of the difference to block difference accumulator 24.

Block difference accumulator 24 accumulates the absolute values of differences from absolute value calculator 22 for each image block. The image block is a unit when the overall area of the long exposure image (or corrected short exposure image) is split into, for example, n×n pixels (n≥2). The larger the motion of the subject in a second exposure time is, the larger the absolute value of a difference from absolute value calculator 22 is. The absolute value is increased by motion blur of a subject image in the long exposure image. In other words, the larger the motion of the subject is, the larger the accumulated value of an image block including the motion is. Block difference accumulator 24 detects an accumulated value, which is calculated for each image block, as a motion amount of the subject. Block difference accumulator 24 outputs a motion amount detected for each image block, to motion blending ratio calculator 12.

Motion blending ratio calculator 12 calculates a blending ratio based on a motion amount detected for each image block. The motion blending ratio is a ratio of blending each of the pixels in the long exposure image and a co-located one of the pixels in the corrected short exposure image. Motion blending ratio calculator 12 outputs the calculated motion blending ratio to motion-adapted image synthesizer 14.

Here, a procedure of calculating a motion blending ratio is discussed below. First, motion blending ratio calculator 12 smoothes motion amounts between image blocks. Specifically, motion blending ratio calculator 12 fragments differences in motion amount between neighboring image blocks and interpolates the motion amounts of pixels in such a manner that the differences in motion amount are allocated according to distances between respective pixels and the barycenter of the image block. Subsequently, motion blending ratio calculator 12 calculates a motion blending ratio for pixels co-located in the long exposure image and the corrected short exposure image in such a manner that a blending ratio of blending the corrected short exposure image with the long exposure image has a positive correlation with the motion amount of the subject. This is because a subject image in the long exposure image is highly likely to blur in an image block where a large motion amount of the subject is detected.

As a result of the smoothing, a change in motion amount between pixels is smoothed across the boundary of the image blocks, and thus the calculated motion blending ratio between the pixels also smoothly changes across the boundary between the image blocks. In other words, the motion blending ratio of the long exposure image and the corrected short exposure image is determined for each pixel instead of each image block. This can reduce blockiness in a post-synthesis motion-adapted image (to be described later).

Motion-adapted image synthesizer 14 synthesizes the long exposure image output from image sensor 4 and the corrected short exposure image output from level adjuster 8, based on the motion blending ratio from motion blending ratio calculator 12, to generate a motion-adapted image. Specifically, motion-adapted image synthesizer 14 performs alpha blending on each of the pixels of the long exposure image and the co-located one of the pixels of the corrected short exposure image by using the motion blending ratio of the pixels as a coefficient. At this point, in an area of a subject image with large blur in the long exposure image, the corrected short exposure image is blended with the long exposure image at a high motion blending ratio. This can correct motion blur of the subject image in the long exposure image. In an area where a subject image in the long exposure image with small motion blur, the corrected short exposure image is blended with the long exposure image at a low motion blending ratio. The blending is performed to avoid unnecessary deterioration in image quality in an area where a subject image has small motion blur in the long exposure image. This is because the S/N of the corrected short exposure image is lower than that of the long exposure image. Motion-adapted image synthesizer 14 outputs the generated motion-adapted image to HDR image synthesizer 18.

Based on the long exposure image and the short exposure image output from image sensor 4, luminance blending ratio calculator 16 calculates a luminance blending ratio of blending the pixels co-located in the short exposure image and the long exposure image. Luminance blending ratio calculator 16 outputs the calculated luminance blending ratio to HDR image synthesizer 18.

HDR image synthesizer 18 synthesizes the motion-adapted image output from motion-adapted image synthesizer 14 and the short exposure image output from image sensor 4, based on the luminance blending ratio from luminance blending ratio calculator 16, to generate an HDR image. HDR image synthesizer 18 performs alpha blending on the pixel of the motion-adapted image and the co-located pixel of the short exposure image by using the luminance blending ratio of the pixels as a coefficient. This can generate an HDR image adaptive for both a motion of the subject and the luminance of the pixel in the long exposure image and the luminance of the pixel in the short exposure image.

1-2. Operations of Image Processor

Figure 4A:
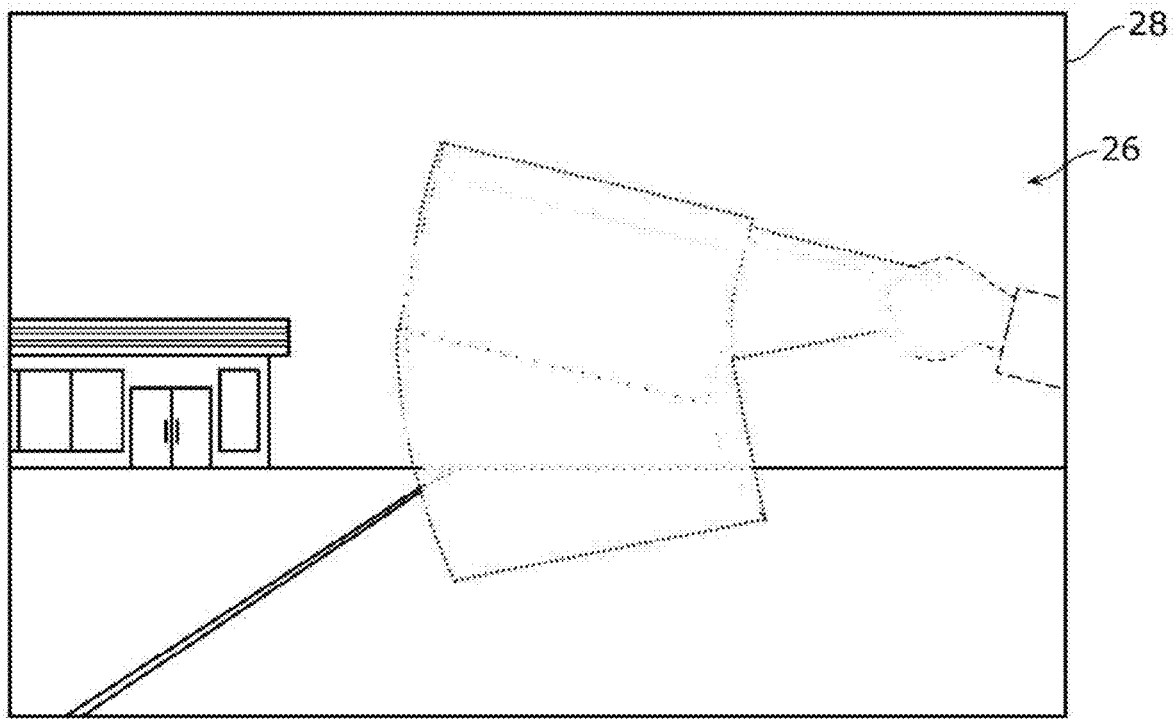
FIG. 4A is a schematic view of an example of a long exposure image according to Embodiment 1.
Figure 4B:
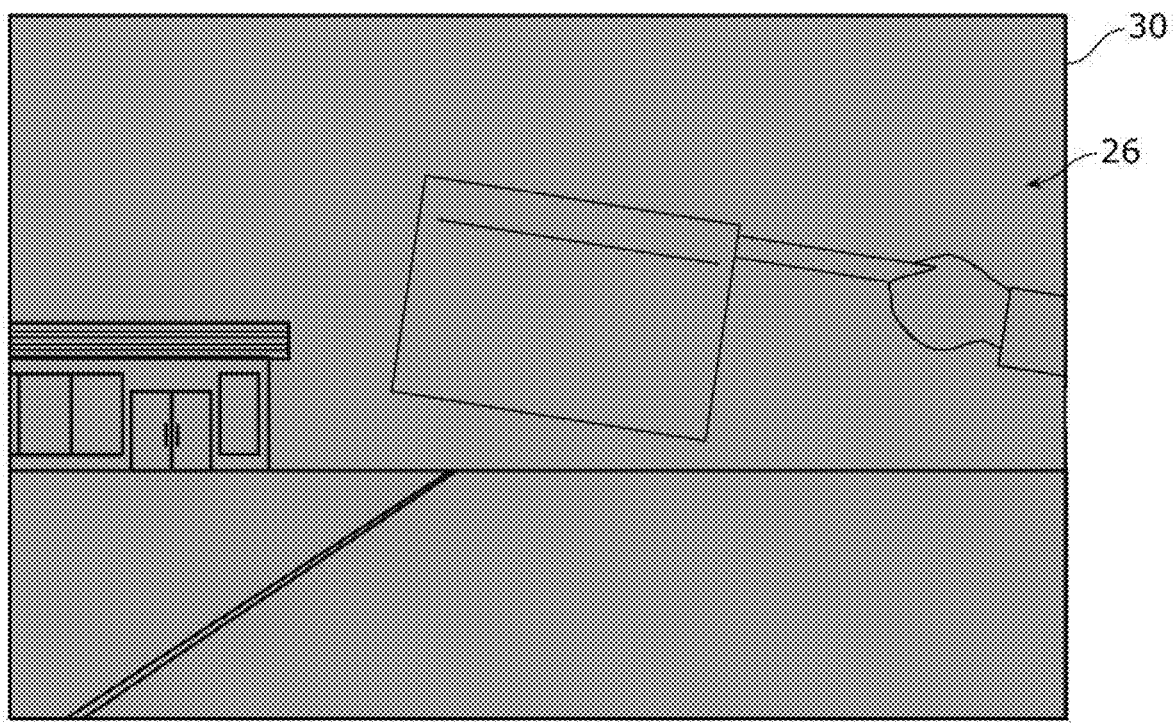
FIG. 4B is a schematic view of an example of a short exposure image according to Embodiment 1.
Figure 4C:
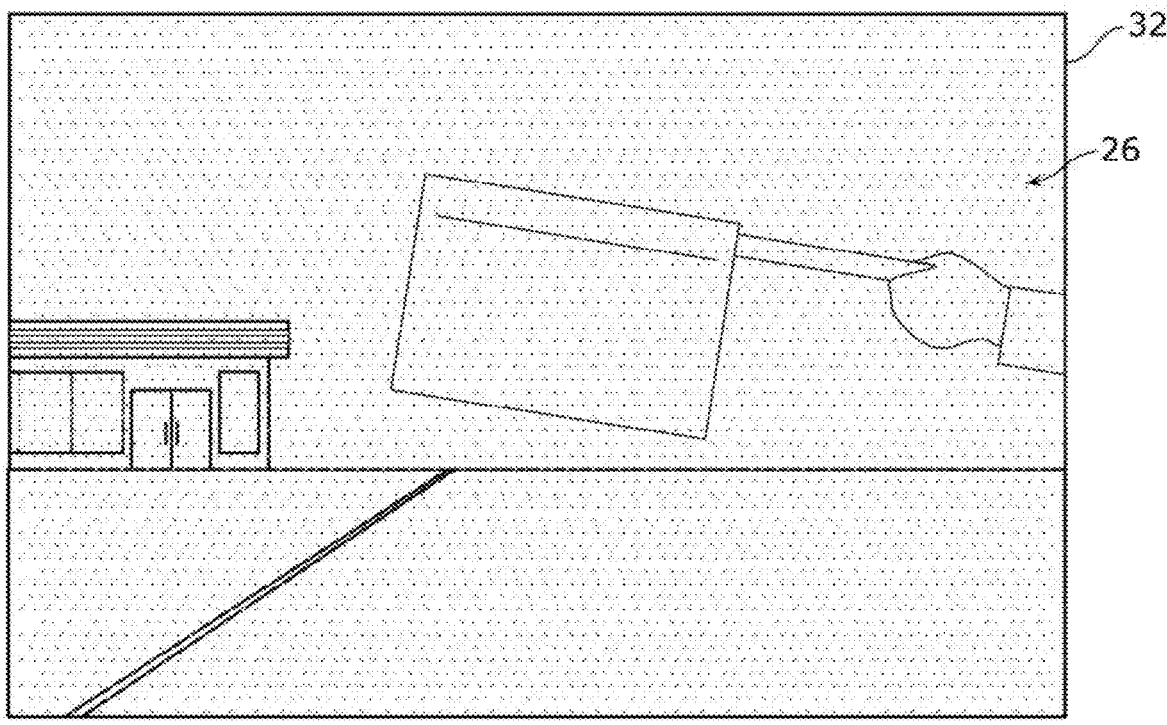
FIG. 4C is a schematic view of an example of a corrected short exposure image according to Embodiment 1.
Figure 4D:
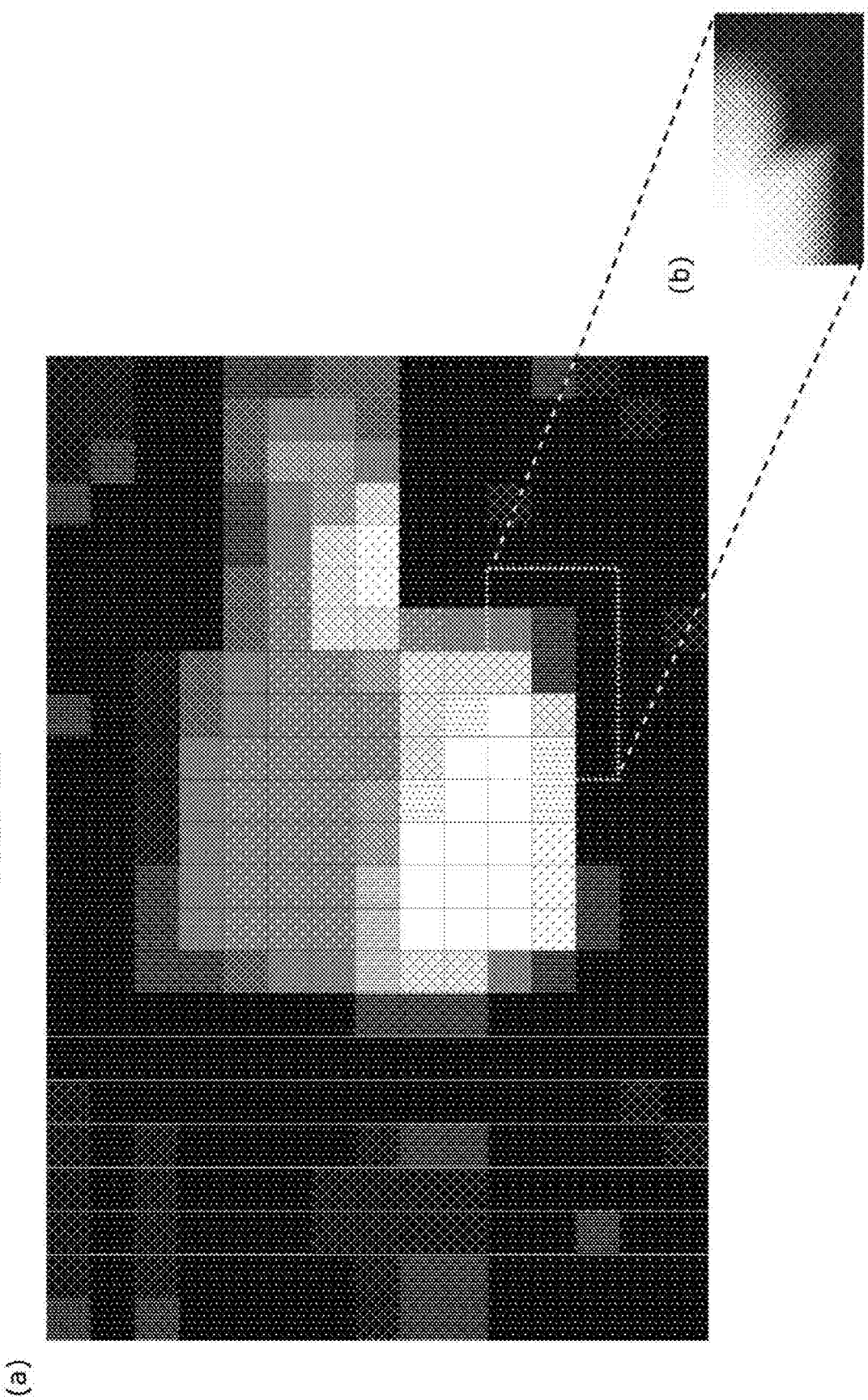
FIG. 4D is a schematic view of an example of a motion amount distribution of a subject detected by a motion amount detector according to Embodiment 1.
Figure 4E:
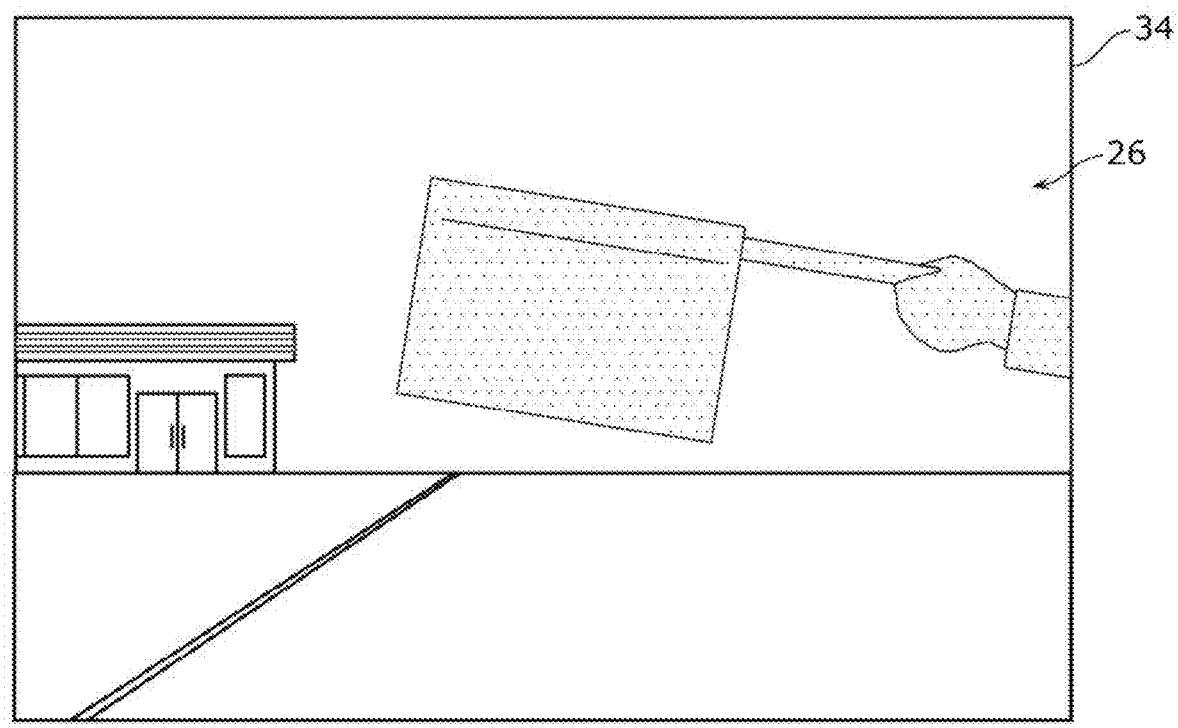
FIG. 4E is a schematic view of an example of an HDR image generated by the image processor according to Embodiment 1.

An operation performed by image processor 2 according to Embodiment 1 is described with reference to FIGS. 3 to 4E. FIG. 3 is a flow chart indicating a flow of the operation performed by image processor 2 according to Embodiment 1. FIG. 4A is a schematic view of an example of long exposure image 28 according to Embodiment 1. FIG. 4B is a schematic view of an example of short exposure image 30 according to Embodiment 1. FIG. 4C is a schematic view of an example of corrected short exposure image 32 according to Embodiment 1. FIG. 4D is a schematic view of an example of a motion amount distribution of subject 26 detected by motion amount detector 10 according to Embodiment 1. FIG. 4E is a schematic view of an example of HDR image 34 generated by image processor 2 according to Embodiment 1.

As illustrated in FIG. 3, sensor controller 6 first determines a first exposure time and a first sensor gain (first exposure sensitivity) and a second exposure time and a second sensor gain (second exposure sensitivity) for image sensor 4 according to the brightness of subject 26 (see FIGS. 4A and 4B) (S101). Image sensor 4 outputs short exposure image 30 of subject 26 captured with the first exposure time and the first sensor gain determined by sensor controller 6, and outputs long exposure image 28 of subject 26 captured with the second exposure time and the second sensor gain (S102).

For example, image sensor 4 captures images of subject 26 as illustrated in FIGS. 4A and 4B. In the examples of FIGS. 4A and 4B, the close view of subject 26 shows a crossing flag held by a hand of a person crossing a road and the distance view of subject 26 shows a building facing a road. At this time, the crossing flag held by the hand of the person is slightly raised.

Image sensor 4 outputs, for example, long exposure image 28 as illustrated in FIG. 4A. As illustrated in FIG. 4A, long exposure image 28 is captured in the second exposure time longer than the first exposure time, and thus long exposure image 28 is entirely brighter than short exposure image 30 (see FIG. 4B). In long exposure image 28, an image of moving subject 26 (the hand of the person and the crossing flag) blurs but an image of fixed subject 26 (e.g., the building) is clearly captured. In FIG. 4A, an edge of the blurred image of subject 26 is indicated by broken lines, whereas an edge of the clear image of subject 26 is indicated by solid lines.

Moreover, image sensor 4 outputs, for example, short exposure image 30 as illustrated in FIG. 4B. As illustrated in FIG. 4B, short exposure image 30 is captured with the first exposure time shorter than the second exposure time, and thus short exposure image 30 is entirely darker than long exposure image 28 (see FIG. 4A), and almost no motion blur occurs in the overall image of subject 26. Returning to FIG. 3, level adjuster 8 adjusts the luminance level of short exposure image 30 output from image sensor 4 to substantially match the luminance level of long exposure image 28, to generate corrected short exposure image 32 from short exposure image 30 (S103).

Level adjuster 8 generates, for example, corrected short exposure image 32 as illustrated in FIG. 4C. As illustrated in FIG. 4C, corrected short exposure image 32 is approximately as bright as long exposure image 28 and is entirely brighter than short exposure image 30 before the luminance level is adjusted. It is to be noted that noise may occur in overall corrected short exposure image 32 when the luminance level is raised. In FIG. 4C, dots indicate the noise in corrected short exposure image 32.

Returning to FIG. 3, motion amount detector 10 detects a motion amount of subject 26 for each image block of long exposure image 28 (or corrected short exposure image 32) by calculating a difference between long exposure image 28 output from image sensor 4 and corrected short exposure image 32 output from level adjuster 8 (S104).

Motion amount detector 10 detects a motion amount of subject 26 for each image block as illustrated in, for example, FIG. 4D. In (a) in FIG. 4D, each square indicates an image block. In the example of (a) in FIG. 4D, an image block having a large motion amount becomes brighter. Specifically, an image block becomes brighter as a difference between a pixel value in long exposure image 28 and a pixel value in corrected short exposure image 32 increases. In FIG. 4D, the motion amount is indicated by the density of shading. The larger the motion amount is, the lower the density of shading is.

Returning to FIG. 3, motion blending ratio calculator 12 calculates a motion blending ratio by smoothing the motion amounts of image blocks (S105). Thus, as illustrated in (b) in FIG. 4D, the motion amount more smoothly changes across a boundary between the image blocks than in (a) in FIG. 4D before the smoothing.

Next, motion-adapted image synthesizer 14 generates a motion-adapted image by synthesizing long exposure image 28 output from image sensor 4 and corrected short exposure image 32 output from level adjuster 8, based on the motion blending ratio from motion blending ratio calculator 12 (S106). In this way, pixels in corrected short exposure image 32 are blended with pixels constituting a small-blur image of subject 26 in long exposure image 28 at a low motion blending ratio, whereas pixels in corrected short exposure image 32 are blended with pixels constituting a large-blur image of subject 26 in long exposure image 28 at a high motion blending ratio. In an area where an image of subject 26 does not blur at all in long exposure image 28, the pixels of long exposure image 28 having a higher S/N may be used as they are without blending of the pixels in corrected short exposure image 32.

Based on long exposure image 28 and short exposure image 30 output from image sensor 4, luminance blending ratio calculator 16 calculates a luminance blending ratio (S107). HDR image synthesizer 18 synthesizes short exposure image 30 output from image sensor 4 and the motion-adapted image output from motion-adapted image synthesizer 14, based on the luminance blending ratio from luminance blending ratio calculator 16, to generate HDR image 34 (S108).

HDR image synthesizer 18 generates, for example, HDR image 34 as illustrated in FIG. 4E. As illustrated in FIG. 4E, in HDR image 34, a large-blur image of subject 26 (a hand of a person and a crossing flag) in long exposure image 28 is replaced with an image of subject 26 (the hand of the person and the crossing flag) in corrected short exposure image 32. At this time, noise stemming from corrected short exposure image 32 slightly occurs in the image of the hand of the person and the crossing flag in HDR image 34. In FIG. 4E, dots indicate the noise in HDR image 34.

1-3. Example and Comparative Example

Figure 5:
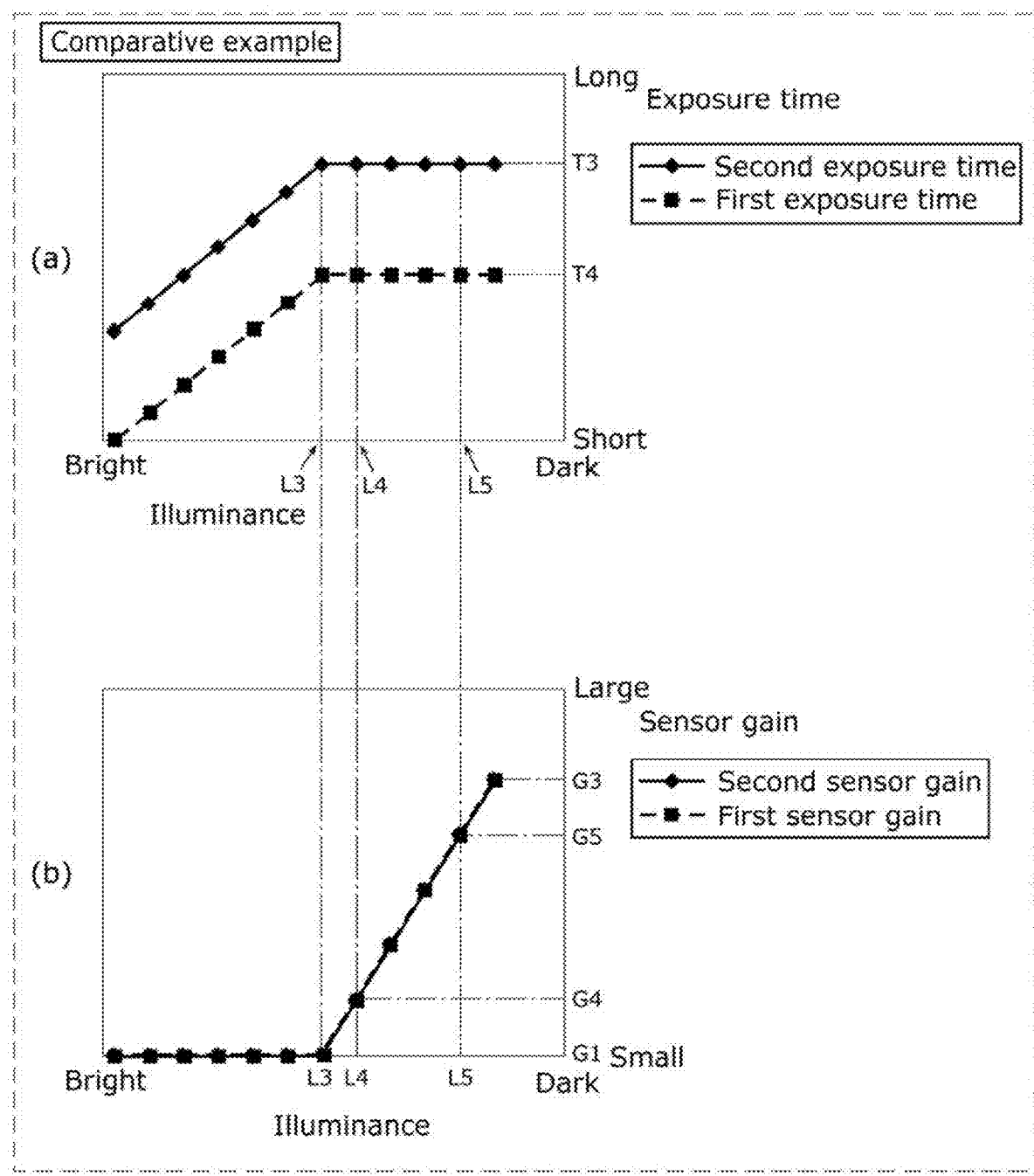
FIG. 5 is a diagram for showing processing performed by a sensor controller of an image processor according to a comparative example.

An image processor according to a comparative example is described with reference to FIGS. 5 to 7. FIG. 5 is a diagram for explaining processing performed by a sensor controller of the image processor according to the comparative example. FIG. 6 is a diagram illustrating a long exposure image, a corrected short exposure image, and an HDR image which are generated by the image processor according to the comparative example when the brightness of the subject is illuminance L4. FIG. 7 is a diagram illustrating a long exposure image, a corrected short exposure image, and an HDR image which are generated by the image processor according to the comparative example when the brightness of the subject is illuminance L5.

As illustrated in (a) and (b) in FIG. 5, when the brightness of the subject decreases from illuminance L3, in the image processor according to the comparative example, the sensor controller controls a first exposure sensitivity so that the first exposure time changes from increasing to constant (T4 (>T1)) and the first sensor gain changes from constant (G1) to increasing. In addition, as illustrated in (a) and (b) in FIG. 5, when the brightness of the subject decreases from illuminance L3, the sensor controller controls a second exposure sensitivity so that the second exposure time changes from increasing to constant (T3) and the second sensor gain changes from constant (G1) to increasing. Each of preset limit values for the first sensor gain and the second sensor gain is G3. It is to be noted that, as illustrated in (a) and (b) in FIG. 5, the graph of the first sensor gain and the graph of the second sensor gain match each other.

FIG. 6 shows the results of imaging of the subject performed by the image processor according to the comparative example in the case where the image sensor is moved horizontally at 16°/second with respect to the subject in a state in which the brightness of the subject is illuminance L4 (approximately 50 Lux: low illuminance). As illustrated in (a) in FIG. 6, large motion blur occurred in a long exposure image (with second exposure time: T3 and second sensor gain: G4) generated by the image processor according to the comparative example. As illustrated in (b) in FIG. 6, medium motion blur occurred in a corrected short exposure image (with first exposure time: T4 and first sensor gain: G4) generated by the image processor according to the comparative example. In this way, as illustrated in (c) in FIG. 6, medium motion blur stemming from the corrected short exposure image occurred in an HDR image generated by the image processor according to the comparative example.

FIG. 7 shows the results of imaging of the subject performed by the image processor according to the comparative example in the case where the image sensor is moved horizontally at 16°/second with respect to the subject in a state in which the brightness of the subject is illuminance L5 (approximately 6 Lux: extremely low illuminance). As illustrated in (a) in FIG. 7, large motion blur and medium noise occurred in a long exposure image (with second exposure time: T3 and second sensor gain: G5 (>G4)) generated by the image processor according to the comparative example. In addition, as illustrated in (b) in FIG. 7, medium motion blur and large noise occurred in a corrected short exposure image (with first exposure time: T4 and first sensor gain: G5) generated by the image processor according to the comparative example. In this way, as illustrated in (c) in FIG. 7, medium motion blur stemming from the corrected short exposure image and large noise occurred in an HDR image generated by the image processor according to the comparative example.

Next, an image processor according to an example is described with reference to FIGS. 2, 8 and 9. FIG. 8 is a diagram illustrating a long exposure image, a corrected short exposure image, and an HDR image which are generated by the image processor according to the example when the brightness of a subject is illuminance L4. FIG. 9 is a diagram illustrating a long exposure image, a corrected short exposure image, and an HDR image which are generated by the image processor according to the example when the brightness of the subject is illuminance L5.

In the image processor according to the example, sensor controller controls a first exposure sensitivity and a second exposure sensitivity as illustrated in (a) and (b) in FIG. 2.

FIG. 8 shows the results of imaging of the subject performed by the image processor according to the example in the case where the image sensor is moved horizontally at 16°/second with respect to the subject in a state in which the brightness of the subject is illuminance L4 (low illuminance). As illustrated in (a) in FIG. 8, large motion blur occurred in the long exposure image (with second exposure time: T3 and second sensor gain: G4) generated by the image processor according to the example. As illustrated in (b) in FIG. 8, almost no motion blur occurred in the corrected short exposure image (with first exposure time: T1 (<T4) and first sensor gain: G6 (>G4)) generated by the image processor according to the example. In this way, as illustrated in (c) in FIG. 8, almost no motion blur stemming from the corrected short exposure image occurred in the HDR image generated by the image processor according to the example.

FIG. 9 shows the results of imaging of the subject performed by the image processor according to the example in the case where the image sensor is moved horizontally at 16°/second with respect to the subject in a state in which the brightness of the subject is illuminance L5 (extremely low illuminance). As illustrated in (a) in FIG. 9, large motion blur and medium noise occurred in a long exposure image (with second exposure time: T3 and second sensor gain: G5) generated by the image processor according to the example. As illustrated in (b) in FIG. 9, comparatively large motion blur occurred but only medium noise occurred in a corrected short exposure image (with first exposure time: T5 (>T4) and first sensor gain: G2 (<G5)) generated by the image processor according to the example. In this way, as illustrated in (c) in FIG. 9, comparatively large motion blur stemming from the corrected short exposure image occurred but only medium noise occurred in an HDR image generated by the image processor according to the example.

In view of the above results, it is confirmed that the visibility of the image is increased because reduced motion blur occurred in the HDR image ((c) in FIG. 8) in the example when the moving subject is imaged under low illumination (illuminance L4) compared to the motion blur occurred in the HDR image according to the comparative example (c) in FIG. 6). In addition, it is confirmed that the visibility of the image is increased because less noise occurred in the HDR image ((c) in FIG. 9) in the example when the moving subject is imaged under extremely low illumination (illuminance L5) compared to the noise occurred in the HDR image according to the comparative example (c) in FIG. 7).

1-4. Advantageous Effects

Image processor 2 according to this embodiment is capable of reducing motion blur in the HDR image because the first exposure time is kept to be short, for example, even when a moving subject is imaged under low illuminance. In addition, the first sensor gain is kept to be small, for example, even when the moving subject is imaged under extremely low illuminance. Thus, it is possible to reduce noise in the HDR image.

Embodiment 2

2-1. Configuration of Image Processor

Figure 10:
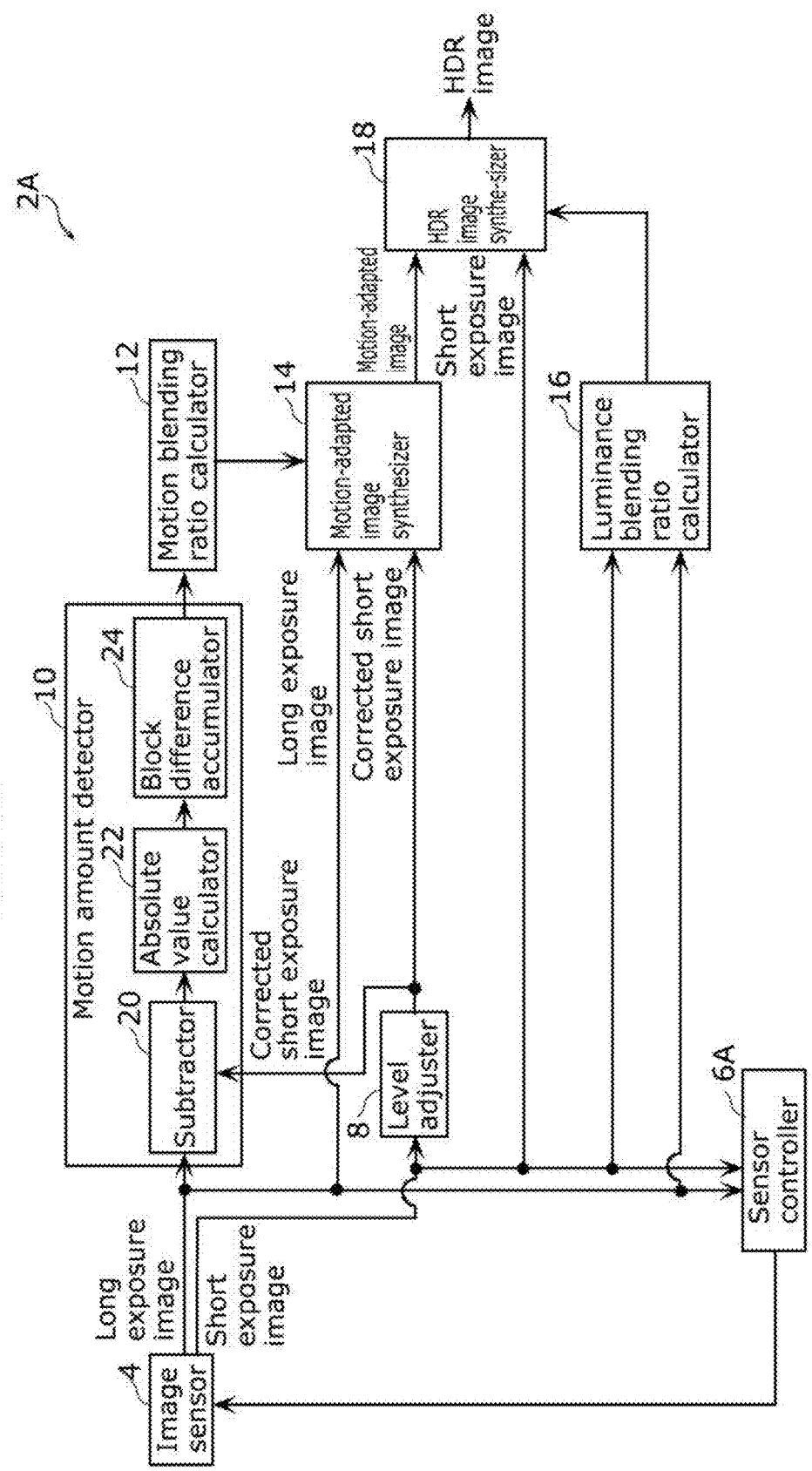
FIG. 10 is a block diagram illustrating a configuration of an image processor according to Embodiment 2.
Figure 11:
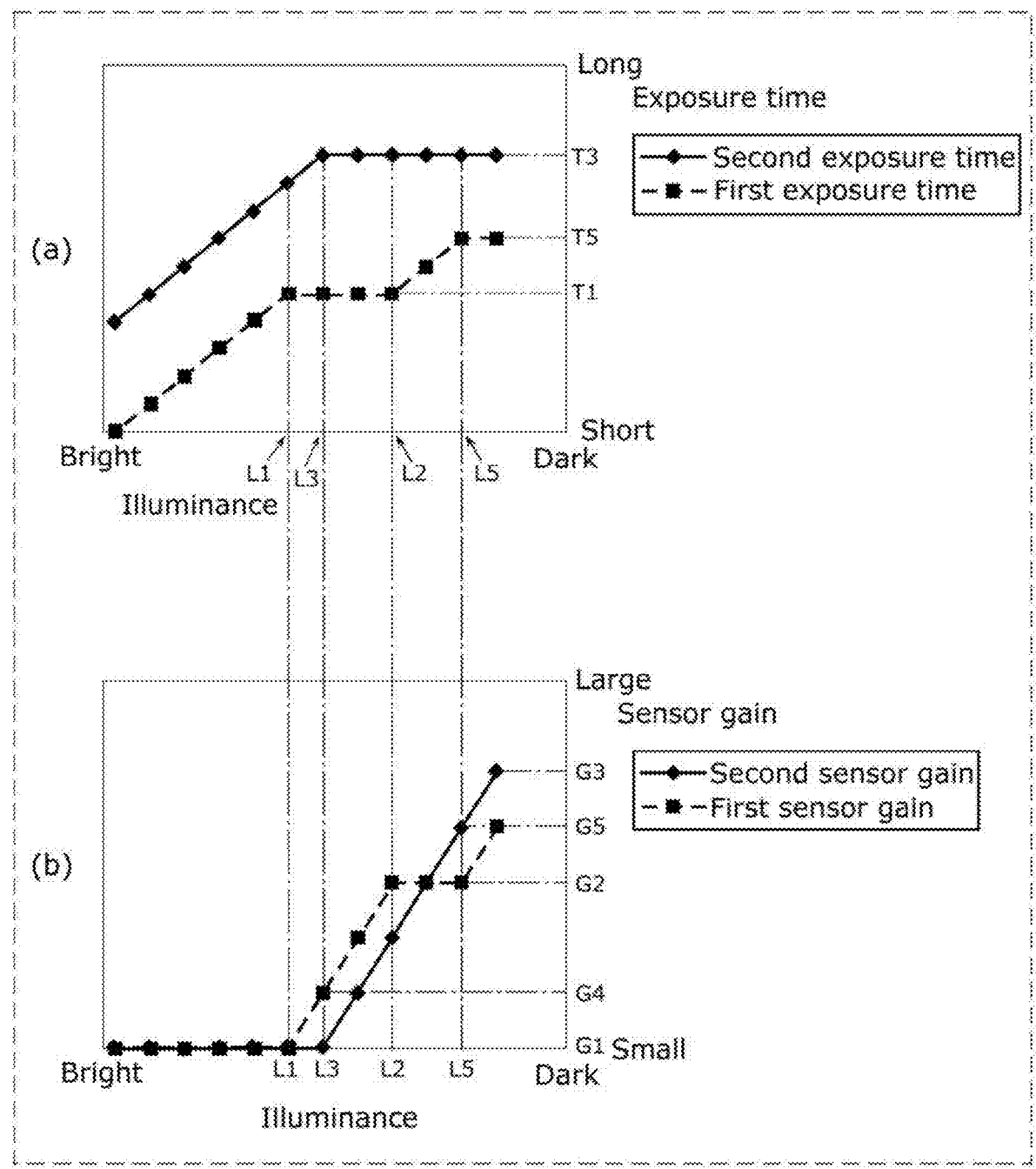
FIG. 11 is a diagram for illustrating processing performed by a sensor controller of the image processor according to Embodiment 2.

A configuration of image processor 2A according to Embodiment 2 is described with reference to FIGS. 10 and 11. FIG. 10 is a block diagram illustrating a configuration of image processor 2A according to Embodiment 2. FIG. 11 is a diagram for illustrating processing performed by sensor controller 6A of image processor 2A according to Embodiment 2. It is to be noted that, in this embodiment, the same constituent elements as those in Embodiment 1 are assigned with the same signs, and are not described repeatedly.

As illustrated in FIG. 10, image processor 2A according to Embodiment 2 is different from image processor 2 in Embodiment 1 in the control of a first exposure sensitivity performed by sensor controller 6A. It is to be noted that the control of a second exposure sensitivity performed by sensor controller 6A is the same as in Embodiment 1.

As illustrated in (a) and (b) in FIG. 11, when the brightness of a subject decreases from illuminance L1, sensor controller 6A controls the first exposure sensitivity so that the first exposure time changes from increasing to constant (T1) and the first sensor gain changes from constant (G1) to increasing. In addition, when the brightness of the subject decreases from illuminance L2, sensor controller 6A controls the first exposure sensitivity so that the first exposure time changes from constant (T1) to increasing and the first sensor gain changes from increasing to constant (G2).

Furthermore, when the brightness of a subject decreases from illuminance L5 (one example of a fourth brightness) lower than illuminance L2, sensor controller 6A controls the first exposure sensitivity so that the first exposure time changes from increasing to constant (T5) and the first sensor gain changes from constant (G2) to increasing. In this case, a preset limit value for the first exposure time is T5, and a preset limit value for the first sensor gain is G5. It is to be noted that, in the examples illustrated in (a) and (b) in FIG. 11, illuminance L5 is approximately 6 Lux.

2-2. Advantageous Effects

As described in Embodiment 1, when the brightness of the subject decreases from illuminance L2, the first exposure time changes from constant to increasing and the first sensor gain changes from increasing to constant. For this reason, for example, when the moving subject is imaged under extremely low illuminance, noise in the HDR image is reduced, but motion blur may occur in the HDR image because the first exposure time becomes longer.

In comparison, when the brightness of the subject decreases from illuminance L5, image processor 6A according to this embodiment performs control so that the first exposure time changes from increasing to constant. In this way, increase in the first exposure time is reduced. Thus, it is possible to reduce motion blur in the HDR image.

Other Variations

The image processors according to one or more aspects have been described above based on the embodiments described above. However, the present disclosure is not limited to the embodiments. The one or more aspects may encompass embodiments obtainable by making various modifications that a person skilled in the art may arrive at to any of the embodiments and embodiments obtainable by combining any of the constituent elements in the different embodiments within the scope of the present disclosure.

In Embodiment 2, when the brightness of the subject decreases from illuminance L3, sensor controller 6A controls the second exposure sensitivity so that the second exposure time changes from increasing to constant (T3) and the second sensor gain changes from constant (G1) to increasing. However, such control is not limited thereto. For example, when the brightness of the subject decreases from illuminance L6 (not illustrated) higher than illuminance L1, sensor controller 6A may control the second exposure sensitivity so that the second exposure time changes from increasing to constant (T2) and the second sensor gain changes from constant (G1) to increasing.

Furthermore, when the brightness of the subject decreases from illuminance L5, sensor controller 6A may control the second exposure sensitivity so that the second exposure time changes from constant (T2) to increasing and the second sensor gain changes from increasing to constant (G7: not illustrated).

In this case, a preset limit value for the second exposure time is T6 (not illustrated).

It is to be noted that each of the constituent elements in each of the embodiments may be implemented by being configured using dedicated hardware or by means of a software program suitable for the constituent element being executed. Each of the constituent elements may be implemented by means of a program executer such as a CPU or a processor reading and executing a software program recorded on a recording medium such as hard disc or semiconductor memory.

Alternatively, a part or all of the functions of the image processor according to any of the embodiments may be implemented by means of a processor such as a CPU executing a program.

A part or all of the constituent elements of any of the image processors may be configured as an IC card which can be attached to and detached from the image processor or as a stand-alone module. The IC card or the module is a computer system configured with a microprocessor, a ROM, a RAM, and so on. The IC card or the module may also be the aforementioned super-multi-function LSI. The IC card or the module achieves its functions through the microprocessor's operations according to the computer program. The IC card or the module may have a tamper-resistance.

The present disclosure may be implemented as the methods described above. The present disclosure may be implemented as computer programs for executing these methods, using a computer, and may also be implemented as digital signals including the computer programs. Furthermore, the present disclosure may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. In addition, the present disclosure may also be implemented as the digital signals recorded on these recording media. Furthermore, the present disclosure may also be implemented as the computer programs or the digital signals transmitted via a telecommunication line, a wireless or wired communication line, a network represented by the Internet, a data broadcast, and so on. In addition, the present disclosure may also be implemented as a computer system including a microprocessor and memory, in which the memory stores the computer programs and the microprocessor operates according to the computer programs. Furthermore, the programs or the digital signals may be performed by another independent computer system by transmitting the programs or the digital signals recorded on the recording media, or by transmitting the programs or digital signals via the aforementioned network and the like.

INDUSTRIAL APPLICABILITY

The present disclosure is applicable to image processors, etc. for generating an HDR image by, for example, synthesizing a plurality of images captured in different exposure times.

The invention claimed is:

1. An image processor which generates a high dynamic range (HDR) image of a subject, the image processor comprising:
an image sensor which outputs, in one-frame time, (i) a first image of the subject captured with a first exposure time and a first sensor gain and (ii) a second image of the subject captured with a second exposure time and a second sensor gain, the second exposure time being longer than the first exposure time;
a sensor controller which, when a brightness of the subject changes, (i) controls a first exposure sensitivity so that the first image has a first image brightness and (ii) controls a second exposure sensitivity so that the second image has a second image brightness, the first exposure sensitivity being a product of the first exposure time and the first sensor gain, the second exposure sensitivity being a product of the second exposure time and the second sensor gain;
a level adjuster which adjusts a luminance level of the first image to substantially match a luminance level of the second image, to generate a corrected image from the first image;
a motion amount detector which detects a motion amount of the subject based on a difference in pixel value between pixels co-located in the corrected image and the second image;
a motion blending ratio calculator which calculates a motion blending ratio based on the motion amount, the motion blending ratio being a ratio between the corrected image and the second image when the corrected image and the second image are blended;
a motion-adapted image synthesizer which synthesizes the corrected image and the second image based on the motion blending ratio, to generate a motion-adapted image; and
an HDR image synthesizer which synthesizes the motion-adapted image and the first image, to generate the HDR image,
wherein the sensor controller:
controls the first exposure sensitivity so that the first exposure time changes from increasing to constant and the first sensor gain changes from constant to increasing, when the brightness of the subject decreases from a first subject brightness; and
controls the first exposure sensitivity so that the first exposure time changes from constant to increasing and the first sensor gain changes from increasing to constant, when the brightness of the subject decreases from a second subject brightness lower than the first subject brightness.

2. The image processor according to claim 1, wherein the sensor controller controls the second exposure sensitivity so that the second exposure time changes from increasing to constant and the second sensor gain changes from constant to increasing, when the brightness of the subject decreases from a third subject brightness lower than the first subject brightness.

3. The image processor according to claim 1, wherein the sensor controller controls the first exposure sensitivity so that the first exposure time changes from increasing to constant and the first sensor gain changes from constant to increasing, when the brightness of the subject decreases from a fourth subject brightness lower than the second subject brightness.

4. An image processing method for generating a high dynamic range (HDR) image of a subject, the image processing method comprising:
(a) outputting, in one-frame time, (i) a first image of the subject captured with a first exposure time and a first sensor gain and (ii) a second image of the subject captured with a second exposure time and a second sensor gain, the second exposure time being longer than the first exposure time;
(b) when a brightness of the subject changes, (i) controlling a first exposure sensitivity so that the first image has a first image brightness and (ii) controlling a second exposure sensitivity so that the second image has a second image brightness, the first exposure sensitivity being a product of the first exposure time and the first sensor gain, the second exposure sensitivity being a product of the second exposure time and the second sensor gain;

(c) adjusting a luminance level of the first image to substantially match a luminance level of the second image, to generate a corrected image from the first image;
(d) detecting a motion amount of the subject based on a difference in pixel value between pixels co-located in the corrected image and the second image;
(e) calculating a motion blending ratio based on the motion amount, the motion blending ratio being a ratio between the corrected image and the second image when the corrected image and the second image are blended;
(f) synthesizing the corrected image and the second image based on the motion blending ratio, to generate a motion-adapted image; and
(g) synthesizing the motion-adapted image and the first image, to generate the HDR image,
wherein in (b):
the first exposure sensitivity is controlled so that the first exposure time changes from increasing to constant and the first sensor gain changes from constant to increasing, when the brightness of the subject decreases from a first subject brightness; and
the first exposure sensitivity is controlled so that the first exposure time changes from constant to increasing and the first sensor gain changes from increasing to constant, when the brightness of the subject decreases from a second subject brightness lower than the first subject brightness.

* * * * *